(12) United States Patent
Parenteau et al.

(10) Patent No.: US 8,773,275 B1
(45) Date of Patent: Jul. 8, 2014

(54) METHOD AND SYSTEM FOR ALERTING AND RETRIEVING LOST DEVICE

(71) Applicants: Cynthia Ann Parenteau, Napa, CA (US); Gabriel Jakobson, Alamo, CA (US)

(72) Inventors: Cynthia Ann Parenteau, Napa, CA (US); Gabriel Jakobson, Alamo, CA (US)

(*) Notice: Subject to any disclaimer, the term of this patent is extended or adjusted under 35 U.S.C. 154(b) by 0 days.

(21) Appl. No.: 13/815,324

(22) Filed: Feb. 21, 2013

(51) Int. Cl.
*G08B 21/00* (2006.01)

(52) U.S. Cl.
USPC .................................. 340/686.6; 340/539.13

(58) Field of Classification Search
USPC ........................... 340/686, 539.13; 455/404.2
See application file for complete search history.

(56) References Cited

U.S. PATENT DOCUMENTS

2013/0040600 A1* 2/2013 Reitnour et al. ........... 455/404.2

* cited by examiner

*Primary Examiner* — Shirley Lu (57) ABSTRACT

A method for displaying point-of-interest ("POI")-related content on an electronic map, comprising: providing a first and a second electronic devices, wherein each of the electronic devices includes an application that is coupled to a digital service on the internet; logically pairing the first and second devices by the digital service; receiving a set of unique identification and GPS coordinates from the two electronic devices; computing physical distance between the electronic devices; and, in response to determining the physical distance exceeds an allowed threshold, transmitting an alarm to the electronic devices.

18 Claims, 14 Drawing Sheets

METHOD AND SYSTEM FOR ALERTING AND RETRIEVING LOST DEVICE

FIELD OF INVENTION

The present invention relates to a communications system among electronic devices leading to identifications of a lost device and its recovery. More specifically, the present invention relates to a communication system between two or more electronic devices and an internet-based service, generating an alarm when a physical separation of the electronic devices occurs.

BACKGROUND OF THE INVENTION

Electronic mobile devices (e.g. Apple iPhone®, Samsung Galaxy® etc.) are prone to being separated from their owners and left behind. At present, electronic lost device recovery systems are confined to software applications (e.g. FoneFinder™, PocketFinder™, as well as services from manufacturers and service providers, etc.) which generally operate on the principle of an application on the electronic device communicating with a service on the internet, broadcasting the device's GPS location. A user who wishes to track/locate his/her device logs into such service and, assuming the electronic device is turned on and a subscribed application paired with the service is running on the device, the user is able to obtain the device's current GPS location. The main drawback of such system is in its being passive: a user needs to proactively use a separate electronic device to communicate with a system which then communicates with the lost device.

SUMMARY OF THE INVENTION

The present invention provides various methods, systems and apparatus for establishing an ad-hoc relationship between electronic devices, allowing one or more of the electronic devices to receive and display alerts notifying of a potential loss of another one of the one or more electronic devices. In contrast with the prior art, where a user needs to proactively realize that their device may be lost, and then procure another device to communicate with a system which provides information on the whereabouts of the first device, in the present invention the user is proactively alerted their device may be lost via one or more other devices (e.g. held by the user's friends) as soon as the user's device is separated from the other ("anchor", "paired") devices by distance and/or time.

Various communication protocols, such as long-polling, socket-based communication, mobile-app "push" technology, etc. may be used to facilitate communication between paired electronic devices and a service in the cloud (i.e. on the internet), wherein the service in the cloud may repeatedly obtain and compare global-positioning system ("GPS") coordinates of the paired devices, computing their physical separation and transmitting alarm messages if an allowed physical separation distance is exceeded.

DESCRIPTION OF THE DRAWINGS

For a more complete understanding of the present invention and further advantages thereof, references are now made to the following Detailed Description, taken in conjunction with the drawings, in which.

DETAILED DESCRIPTION

Figure 1A:
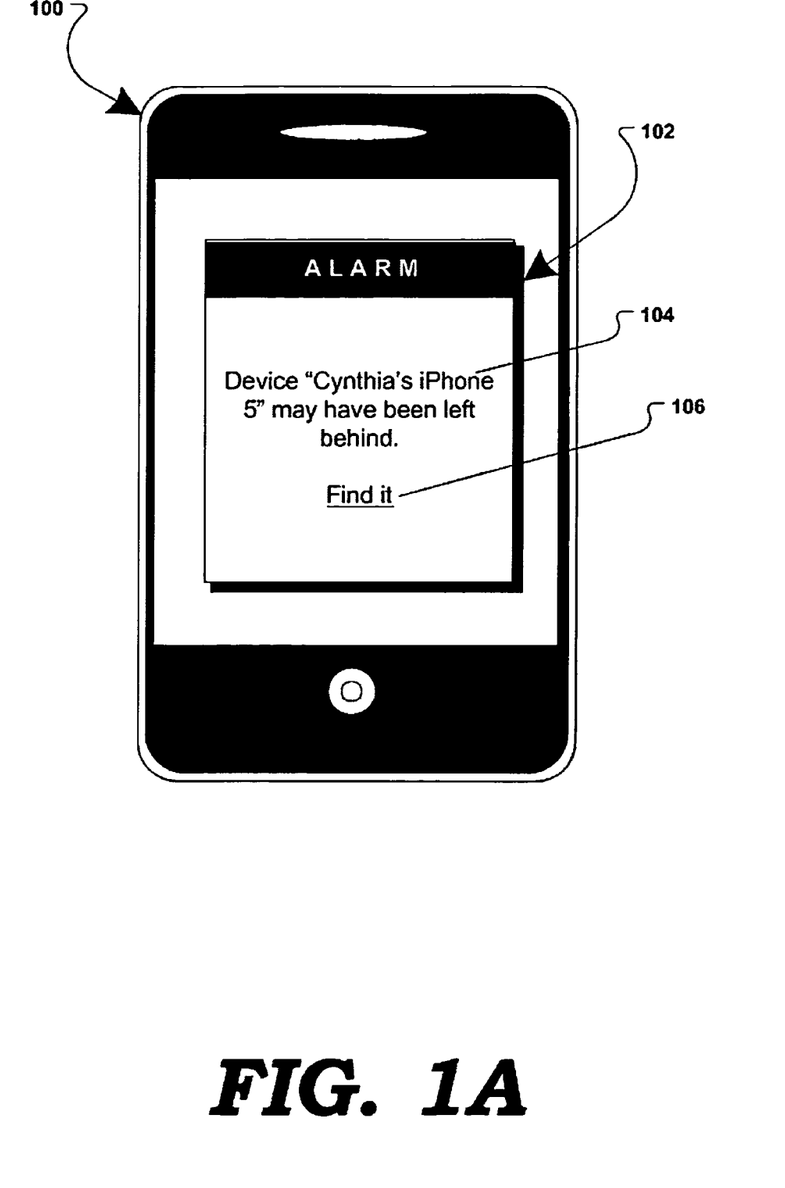
FIGS. 1A-1C are generalized block diagrams illustrating alarms displayed in an application running on an electronic device.
Figure 1B:
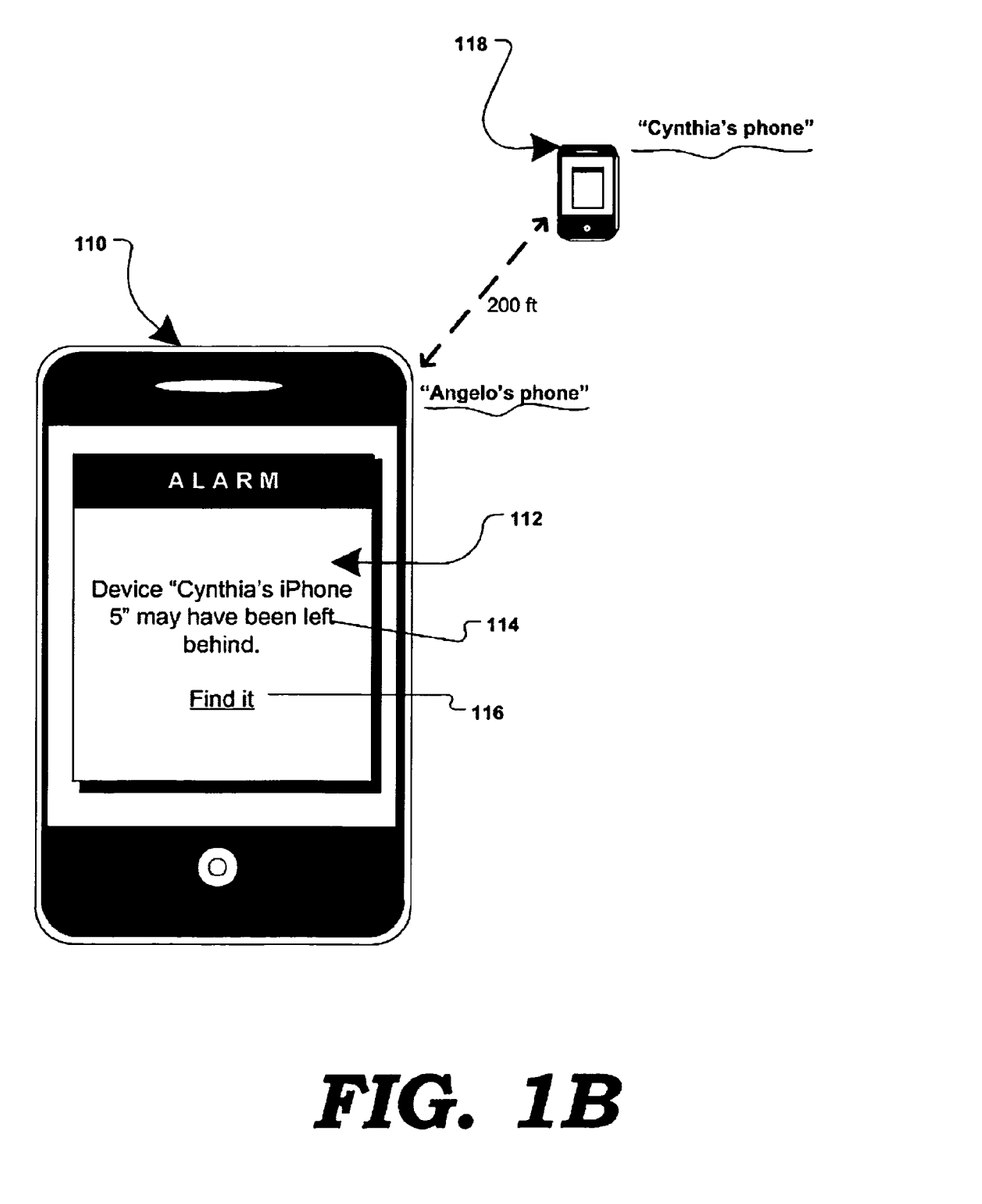
Figure 1C:
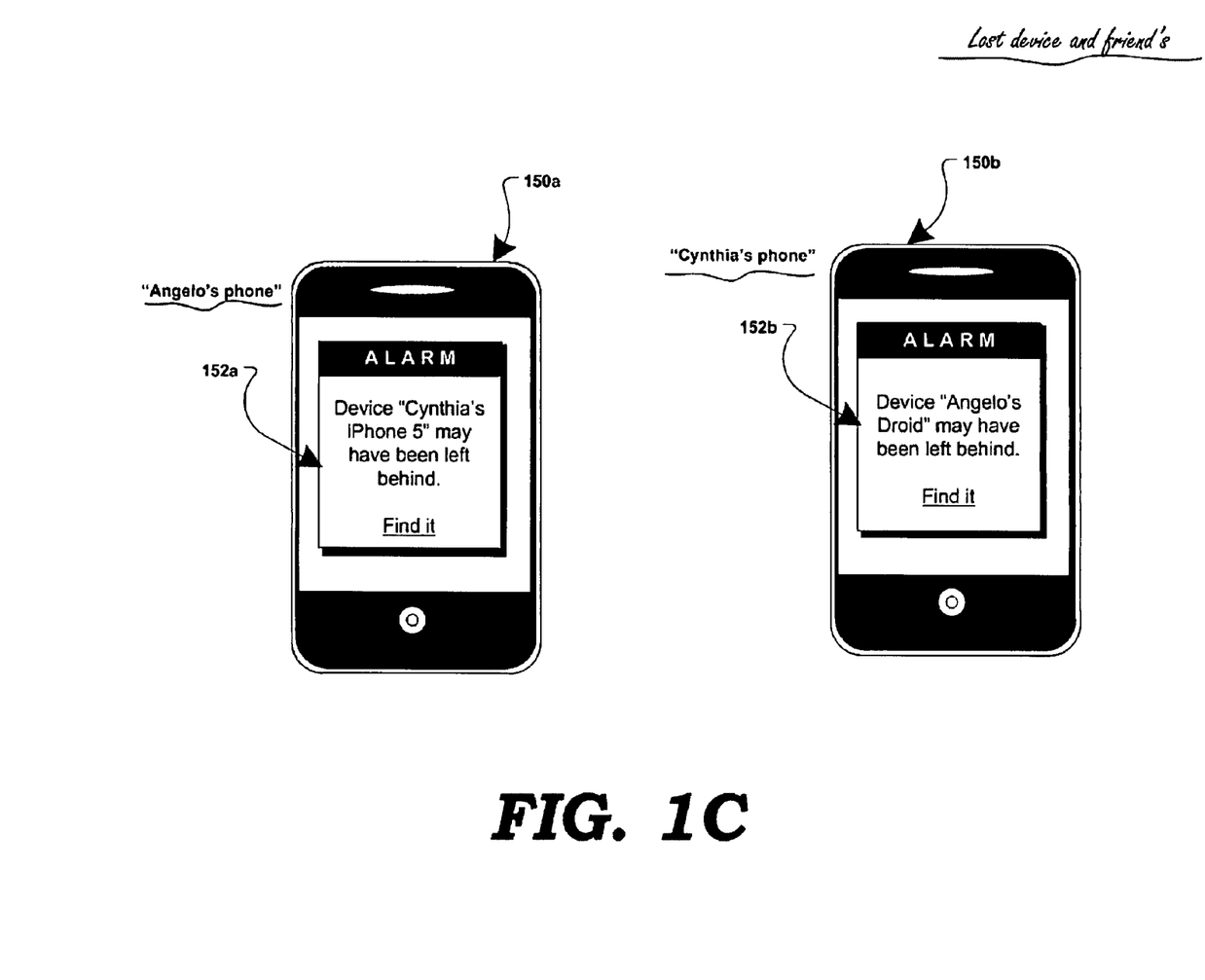

FIGS. 1A-1C are generalized block diagrams illustrating alarms displayed in an application running on an electronic device. The alarm may be a visual/audio/media/electronically-transmitted queue to a person informing the person that an alarm-state has been triggered. The alarm-state may be defined as a state in which two or more paired devices have exceeded a physical distance between them; or, that at least one of the devices has lost communication with the other devices(s), or any other defined condition. Devices are said to be paired when the user(s) of the devices accepts a pairing with the other device(s), and a communications server between the devices maintains the paired state.

Referring now to FIG. 1A, an electronic device 100 may display an alarm dialog 102 (window, application, etc.) The alarm dialog 102 may inform a user that a connection with a remote device (in this example "Cynthia's iPhone 5" 104) has terminated abnormally. In the presently-preferred embodiment, it is not distinguished whether a remote device, e.g. 104, has been lost, or the current device 100 has been lost—the alarm 102 is presented indication the two electronic devices, 100 and 104, have been physically separated or at least one of the devices has stopped communicating.

Referring now to FIG. 1B, a physical separation of an arbitrary distance (e.g. 200 ft) between two paired electronic devices: "Angelo's phone" 110 and "Cynthia's Phone" 118, may cause an alarm 112 to be presented. In the present illustration, the alarm 112 is presented only on the device 110 for illustrative purposes only; in a real implementation, both the devices 110 and 118 may display an alarm. The distance 200 ft may be user definable. One or more users may agree on a physical distance (among other conditions) which triggers an alarm. A hyperlink "Find it" 116 (106 in FIG. 1A) may be displayed on the electronic device 110, providing the user of the device with more information on where the remote device 118 may physically be.

Referring now to FIG. 1C, both electronic devices "Angelo's phone" 150a and "Cynthia's Phone" 150b may display reciprocal alarm messages 152a (e.g. "Device "Cynthia's iPhone 5" may have been left behind.") and 152b (e.g. "Device "Angelo's Droid" may have been left behind.") respectively. Each alarm message may reference the paired device deemed lost. In other possible implantations, the two alarms may be different (e.g. due to user customization, etc.)

Please note that it is unlikely to be determined which of the two devices is technically "lost"; therefore, both devices may display a message whereas to a human owner, only one of the devices may technically really be "lost". In other possible embodiments, a more precise determination of which of the devices may really be "lost" using various method, for example assuming a device that has not been physically moved is the "lost" device, under the assumption that the device that has been physically moved is with the owner, who has physically changed location, thus leaving the "lost" device behind.

FIGS. 2A-2F are generalized block diagrams illustrating a system interconnecting electronic devices, allowing the devices to pair and alert each other when a device becomes lost. Electronic devices may use various technologies (e.g. push notifications, AJAX calls, etc.), means and protocols (e.g. TCP/IP, cell communication protocols, etc.) to communicate with each other via a central server. In the presently-preferred embodiment, the central server may be a service remote to both electronic devices, whereas in other possible embodiments communication between devices may be direct (e.g. Bluetooth pairing.)

Figure 2A:
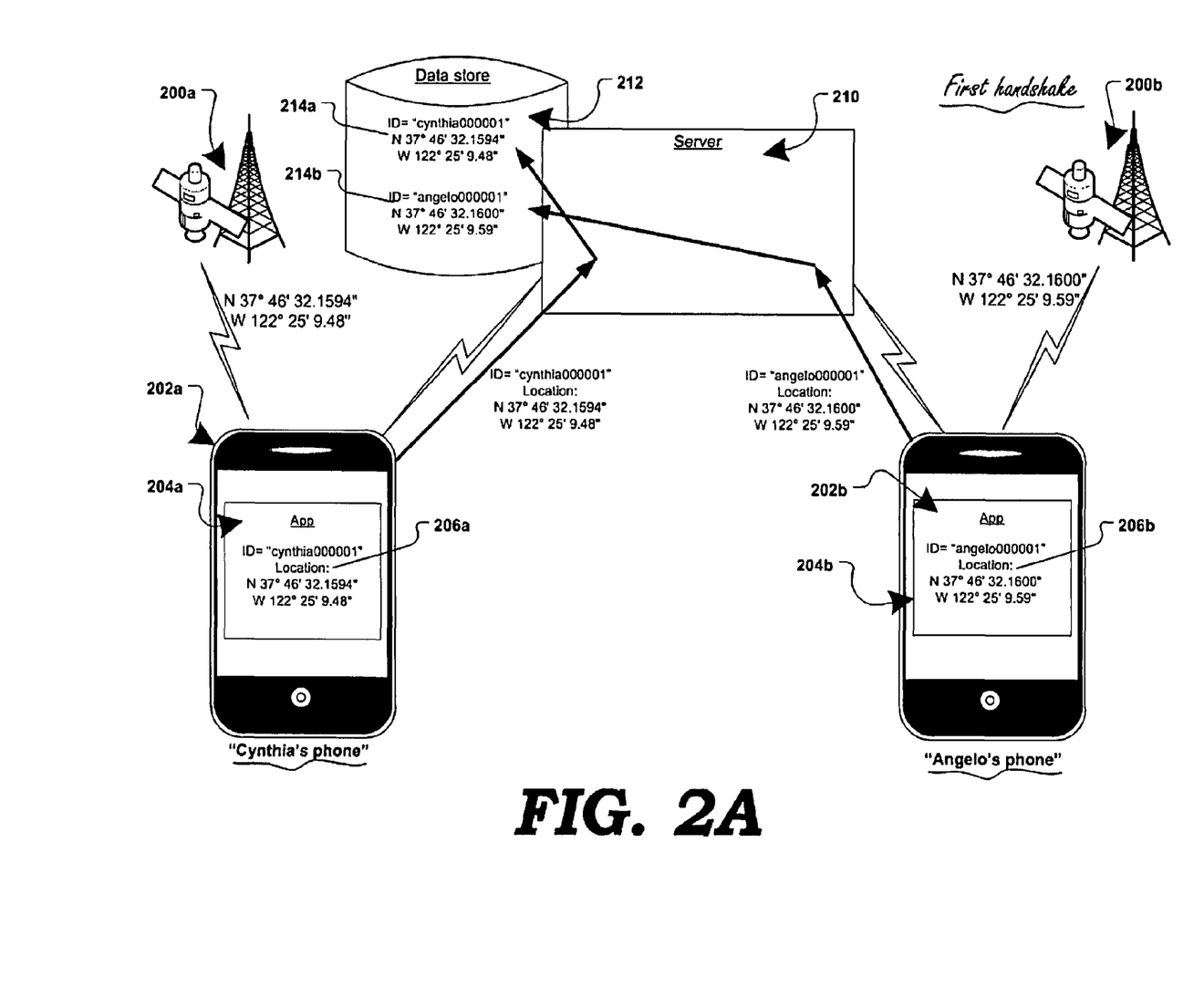
FIGS. 2A-2F are generalized block diagrams illustrating a system interconnecting electronic devices, allowing the devices to pair and alert each other when a device becomes lost.

Referring now to FIG. 2A, two electronic devices: "Cynthia's phone" ("first electronic device") 202a and "Angelo's phone" ("second electronic device") 202b may be paired. The two devices may run applications 204a and 204b respectively, where the applications 204a and 204b run on an operating system (e.g. iOS®, Android®, etc.) and are used to facilitate a communication between the electronic devices and a central server 210.

The first electronic device 202a may receive its geographic locations (e.g. GPS coordinates N 37° 46' 32.1594" W 122° 25' 9.48") from a GPS provider 200a (e.g. a cellphone tower, a GPS satellite, etc.) Similarly, the second electronic device 202b may receive its geographic locations (e.g. GPS coordinates N 37° 46' 32.1600" W 122° 25' 9.59") from a GPS provider 200b (e.g. a cellphone tower, a GPS satellite, etc.)

The first and second electronic devices may communicate with a server 210 through a cellular, or any other communications network. The applications 204a and 204b running on the first and second electronic devices, 202a and 202b respectively, may communicate with the server 210 via the operation systems on their respective electronic devices. The server 210 may have access to a data store 212 for storing information related to the electronic devices in communication with the server 210.

The server 210 may receive information identifying the first electronic device 202a and including its GPS coordinates. For example, "ID="cynthia000001" Location: N 37° 46' 32.1594" W 122° 25' 9.48"" may be information 206a included with the first device 202a and transmitted to the server 210. Similarly, "ID="ID="angelo000001" Location: N 37° 46' 32.1600" W 122° 25' 9.59"" may be information 206b included with the second device 202b and transmitted to the server 210.

The server 210 may then store the device information 206a and 206b as storable information 214a and 214b, respectively, in the data store 212. The first and second electronic devices may receive their own individual GPS coordinates at various frequencies; and, may transmit their identifying information and GPS coordinates to the server 210 at other various frequencies.

Figure 2B:
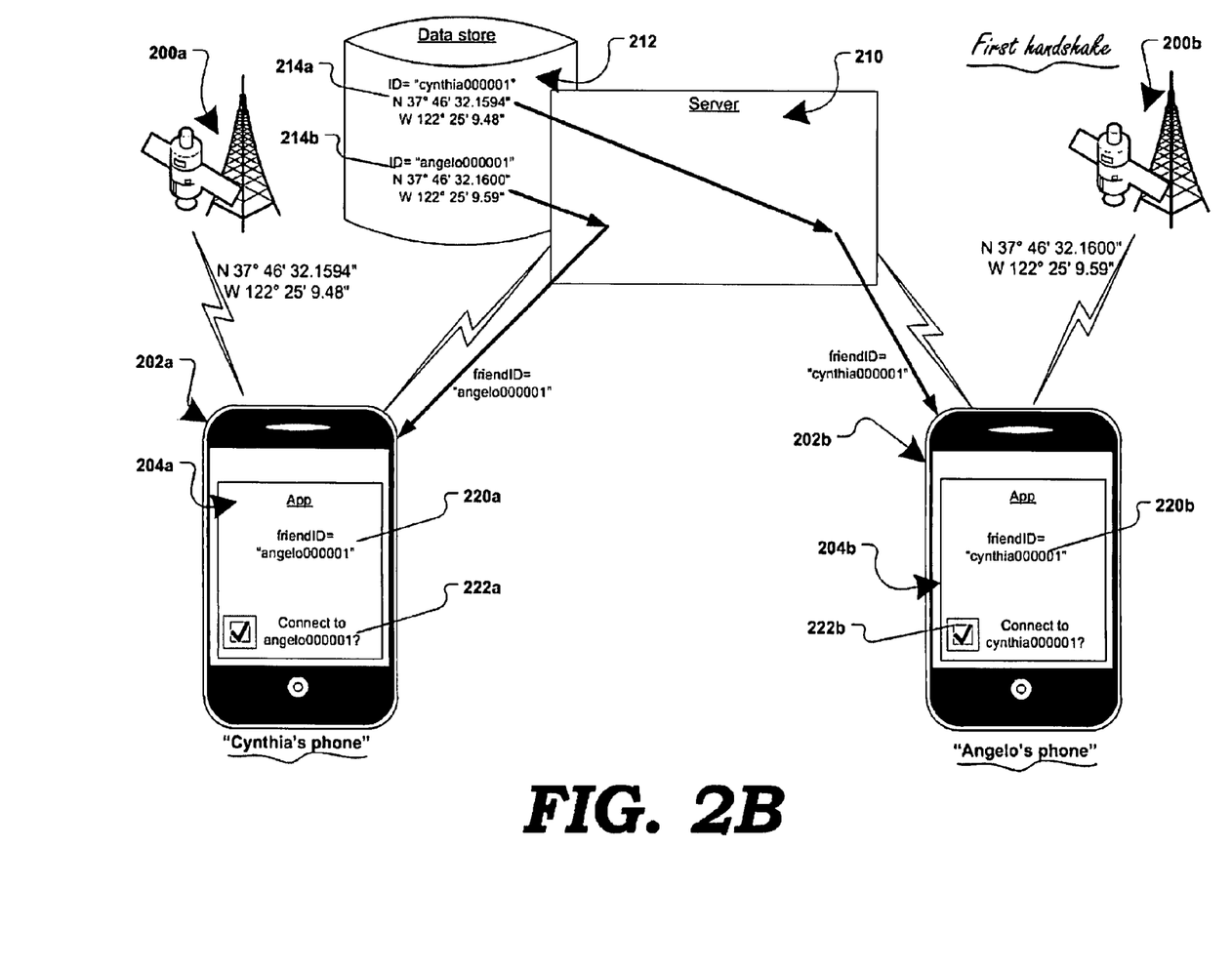

Referring now to FIG. 2B, the server 210 may relay information of the first and second electronic devices, to each other. The stored information pertaining to the first electronic device 214a may be transmitted to the second electronic device 202b. Similarly, the stored information pertaining to the second electronic device 214b may be transmitted to the first electronic device 202a. Such transmission may be initiated for many reasons, among which are: the users of the two electronic devices are connected through a social network, e.g. Facebook®; and/or the two electronic devices are physically close to each other as determined by the server 210 given the devices' GPS coordinates, etc.

The first electronic device 202a may display to its user an invite to pair with the second electronic device 202b, the invite 204a may contain information 220a identifying the second device (e.g. "friendID="angelo000001"); as well as displaying a graphical way for the user to choose to initiate the pairing, illustrated here as a checkmark (or button or any other means of selection 222a).

Similarly, the second electronic device 202b may display to its user an invite to pair with the first electronic device 202a, the invite 204b may contain information 220b identifying the first device (e.g. "friendID="cynthia000001"); as well as displaying a graphical way for the user to choose to initiate the pairing, illustrated here as a checkmark (or button or any other means of selection 222b). In various implementations either one of the users, or both users, would need to choose to pair their devices for pairing to be initiated.

Figure 2C:
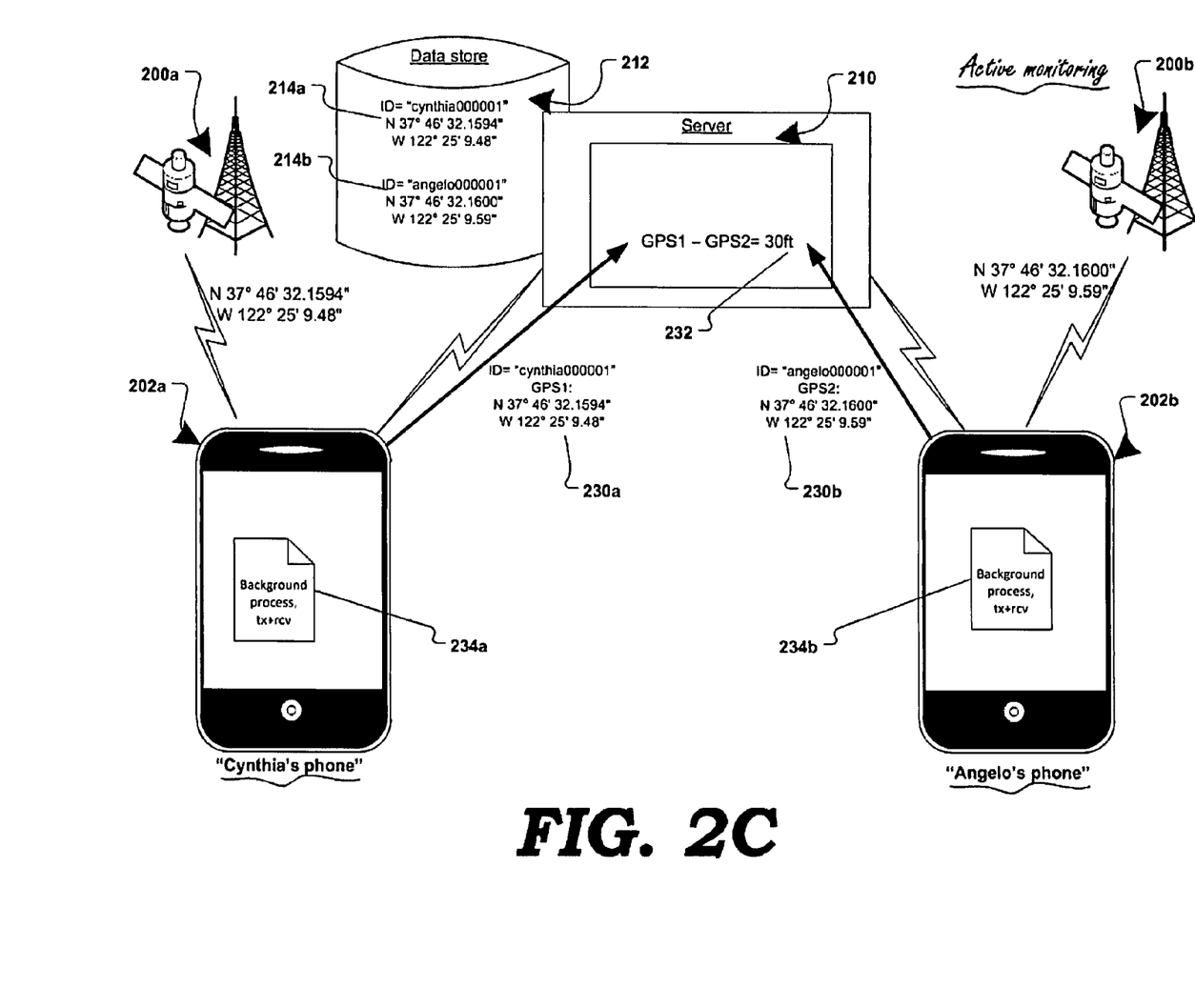

Once the two electronic devices 202a and 202b are actively paired, each device may transmit its updated GPS coordinates, 230a and 230b, respectively, to the server 210, at various intervals and/or in response to various events. The server 210 may compare the GPS coordinates 230a and 230b, for example by calculating the distance 232 (e.g. 30 feet) between the two sets of GPS coordinates.

In one presently-preferred embodiment, applications on the client devices that comprise the present invention, may operate as background services 234a and 234b, on their respective electronic devices 202a and 202b, allowing these devices to serve other content to their users with little or no visual interruption to their users (until an alarm is displayed).

Figure 2D:
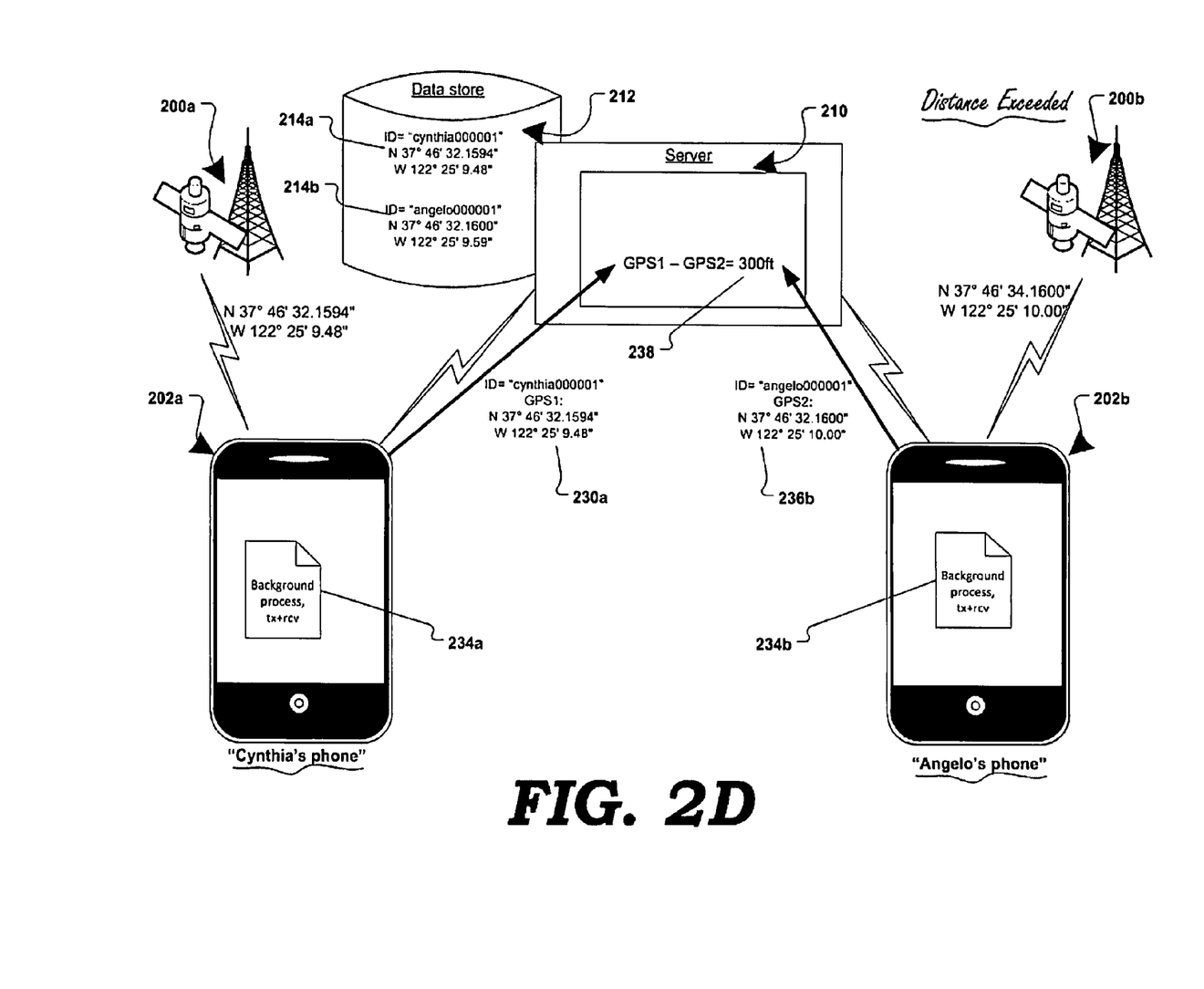

FIG. 2D illustrates a situation where the distance 238 between the two electronic devices, 202a and 202b, is determined to be 300 feet. The distance 238 may be determined by the server 210 comparing the GPS coordinates of two paired devices: 202a transmitting its GPS coordinates as "GPS1:N 37° 46' 32.1594"W 122° 25' 9.48" 230a, and 202b transmitting its GPS coordinates as "GPS2:N 37° 46' 32.1600"W 122° 25' 10.00" 230b. Accordingly, new GPS coordinates may be updated in the data store 212, which would allow tracking of devices over time.

Figure 2E:
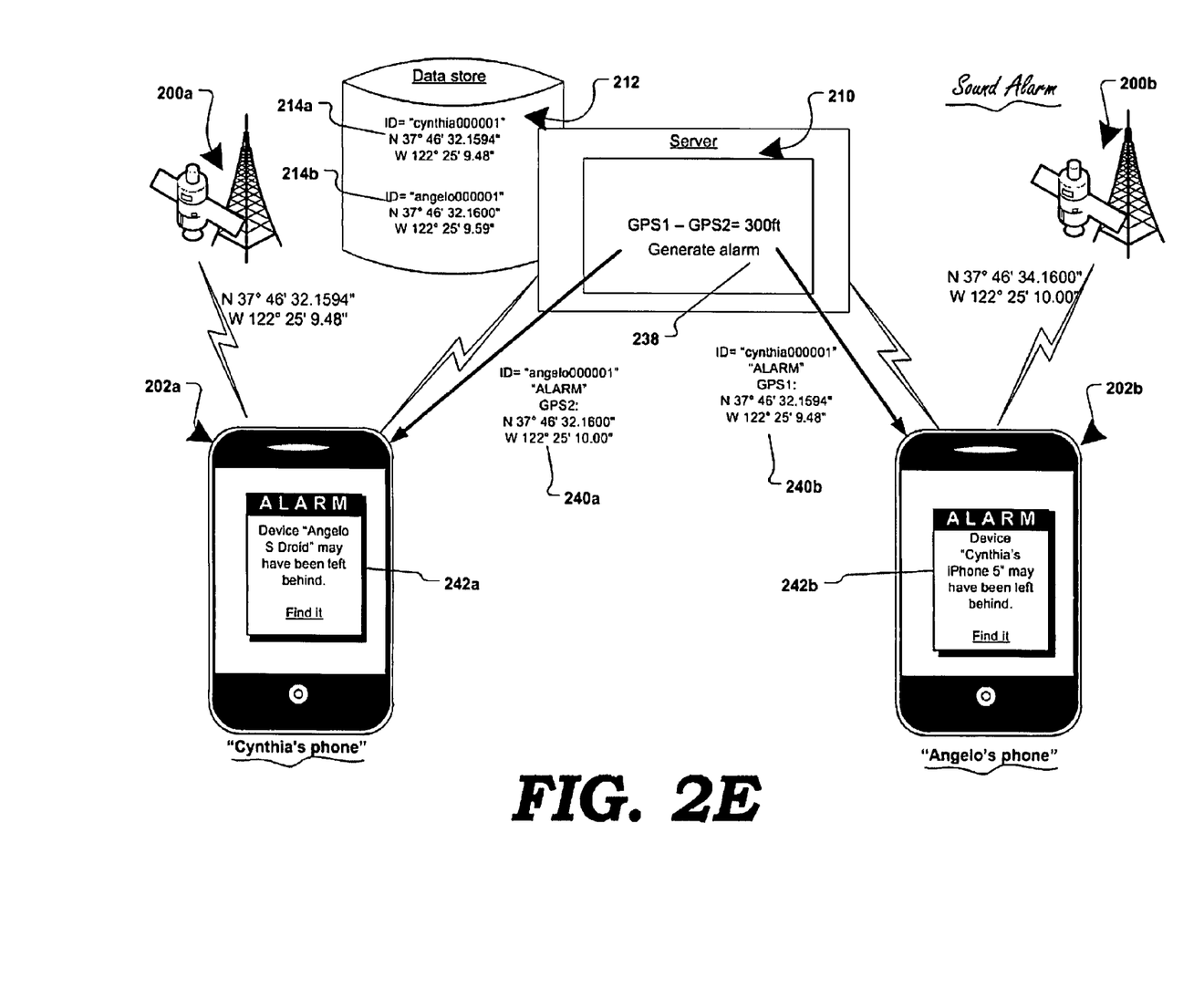

A computed distance 238 greater than a certain threshold (e.g. 300 feet where a threshold is 100 ft), may trigger an alarm. Referring now to FIG. 2E, the server 210 may raise an alarm state, transmitting messages to the first and second paired devices. For example, the first electronic device 202a may receive an alarm message like "Device "Angelo's Droid" may have been left behind." 242a. Additional information, such as a possible location of the second device, derived from the data 240a "ID="angelo000001" "ALARM" GPS2:N 37° 46' 32.1600"W 122° 25' 10.00" may be displayed to the user of the first device.

Similarly, the second electronic device 202b may receive an alarm message like "Device "Cynthia's iPhone 5" may have been left behind." 242b. Additional information, such as a possible location of the second device, derived from the data 240b "ID=cynthia000001""ALARM"GPS1:N 37° 46' 32.1594"W 122° 25' 9.48"" may be displayed to the user of the second device.

Figure 2F:
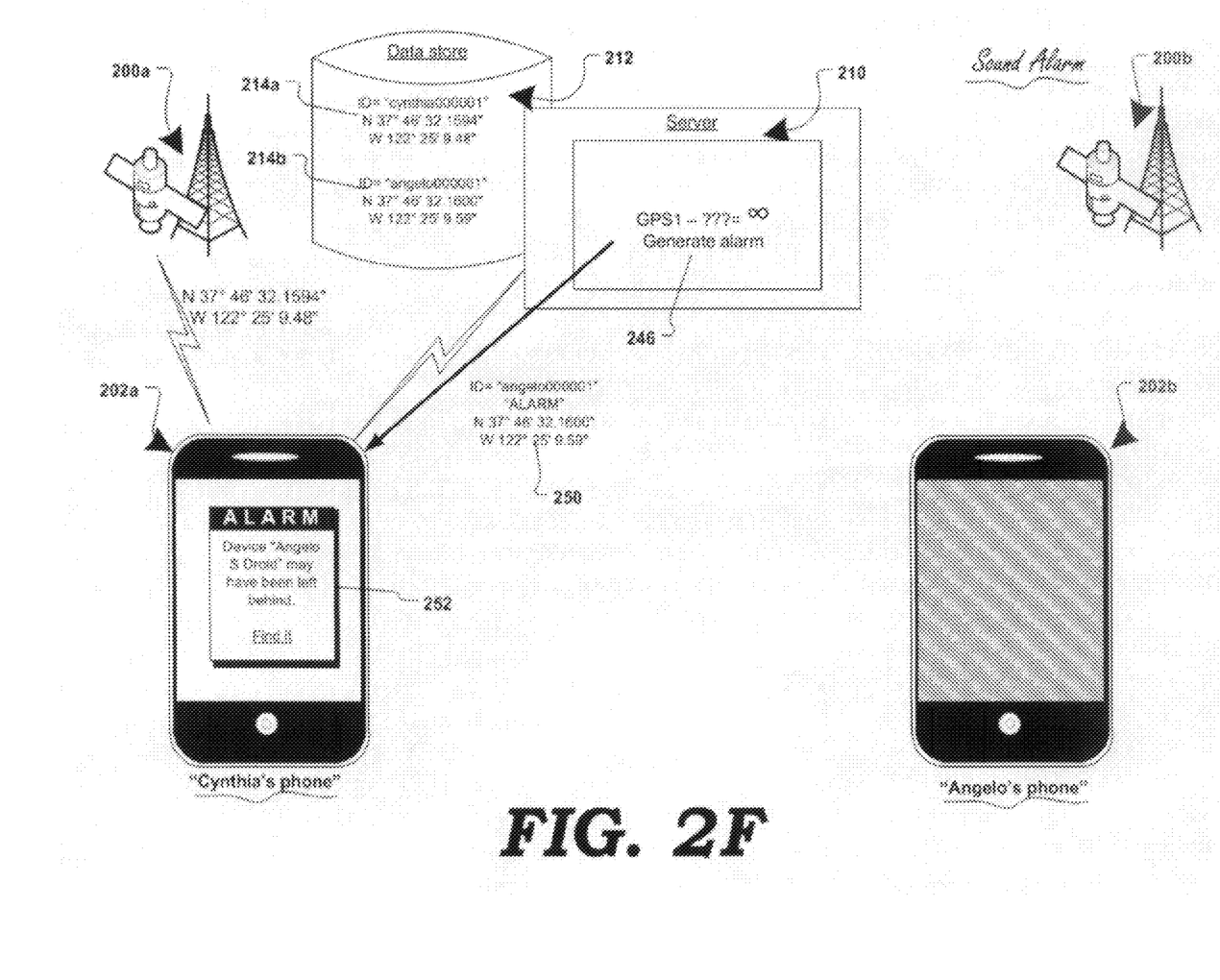

In one preferred embodiment of the present invention, illustrated in FIG. 2F, an alarm may be sent in response to an interruption in communication between paired devices. For example, if the battery of a device dies, or the device is stolen and/or turned off, an alarm sounds on one or more paired devices.

For example, electronic device "Angelo's phone" 202b may be incommunicative to the server 210 (for various possible reasons: it has been turned off, as result of OS/application error, network/communication issues, etc.) Upon not receiving communication from the electronic device "Angelo's phone" 202b, the server 210 may generate an alarm 246 and broadcast the alarm to all devices paired with the device 202b. In this illustration, the electronic device "Cynthia's phone" 202a may receive an electronic communication 250 (e.g. ID="angelo000001" "ALARM" N 37° 46' 32.1600" W 122° 25' 9.59"), causing device 202a to display a message to its user indicating a paired device may have been lost (e.g. the message 252 to the user of the device 202a may read "Device "AngeloS Droid" may have been left behind. Find it")

In alternate related embodiments, the message 252 to the user may include one or more of the following: the last known location of the remote paired device 202b (e.g. retrieving data storing the location 214b of the remote paired device 202b in the data store 212), and/or a hyperlink such as the words "Find It" allowing the user of the device 202a to be guided to the last known location of the remote device 202b, etc.

Figure 3A:
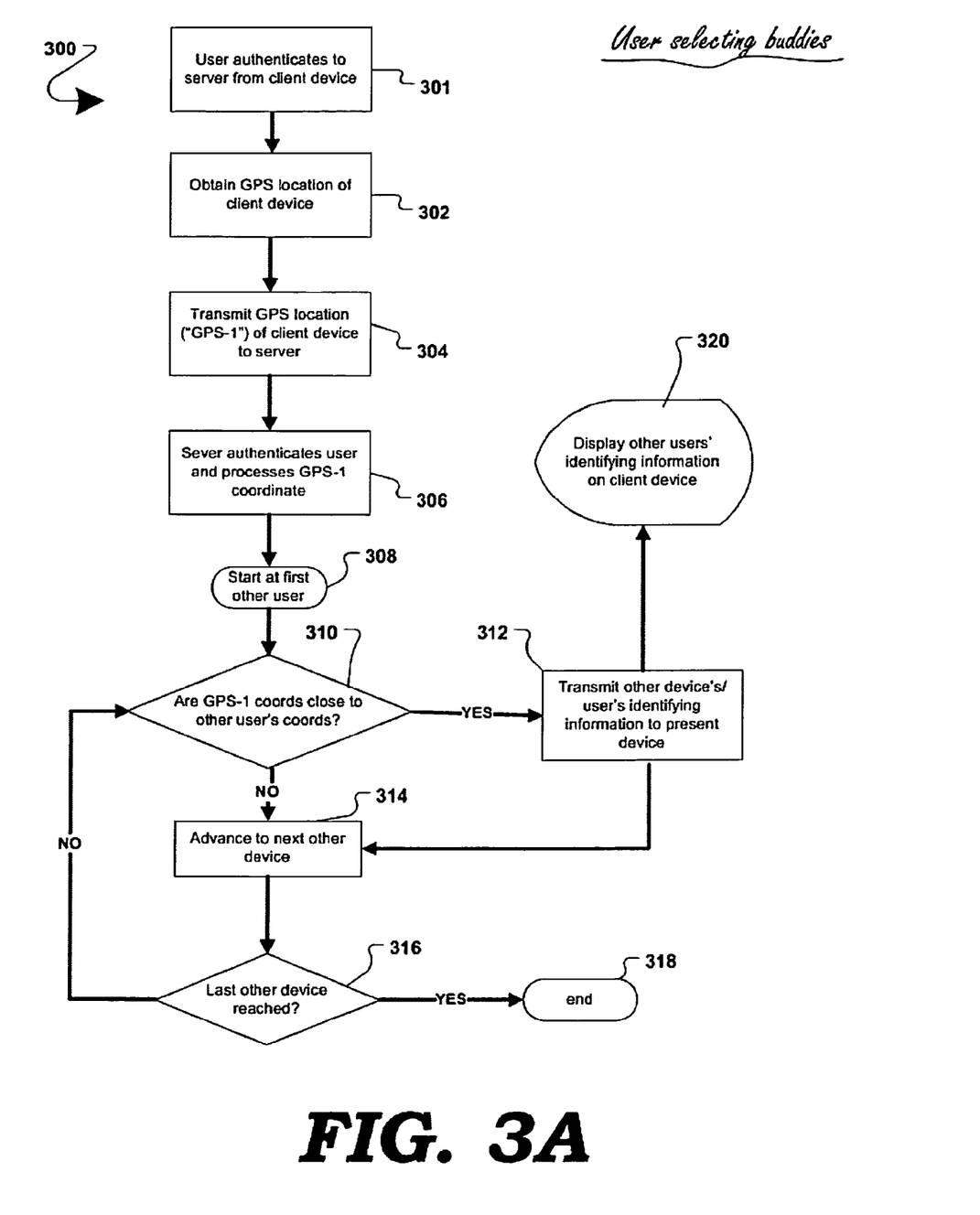
FIGS. 3A-3C are generalized flow diagrams illustrating a method for interconnecting electronic devices, allowing the devices to pair and alert each other when a device becomes lost.
Figure 3B:
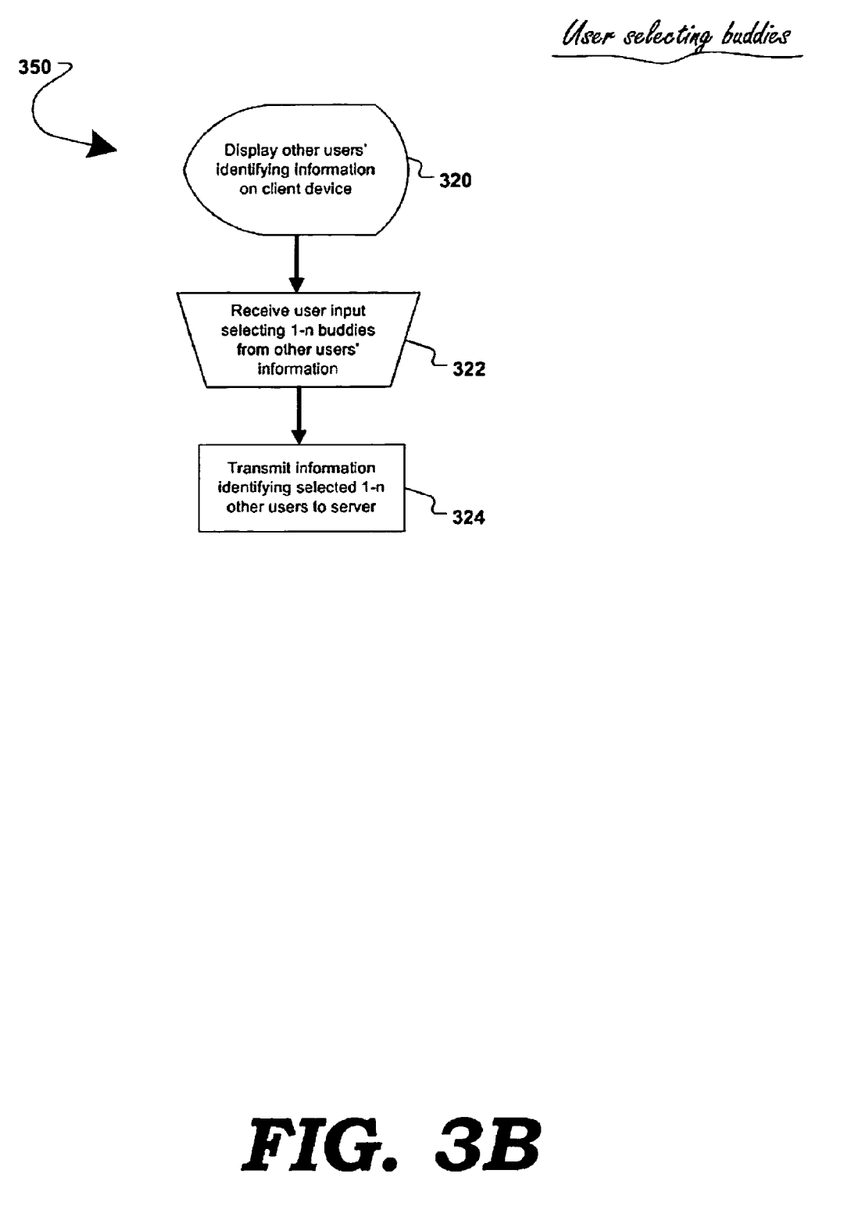
Figure 3C:
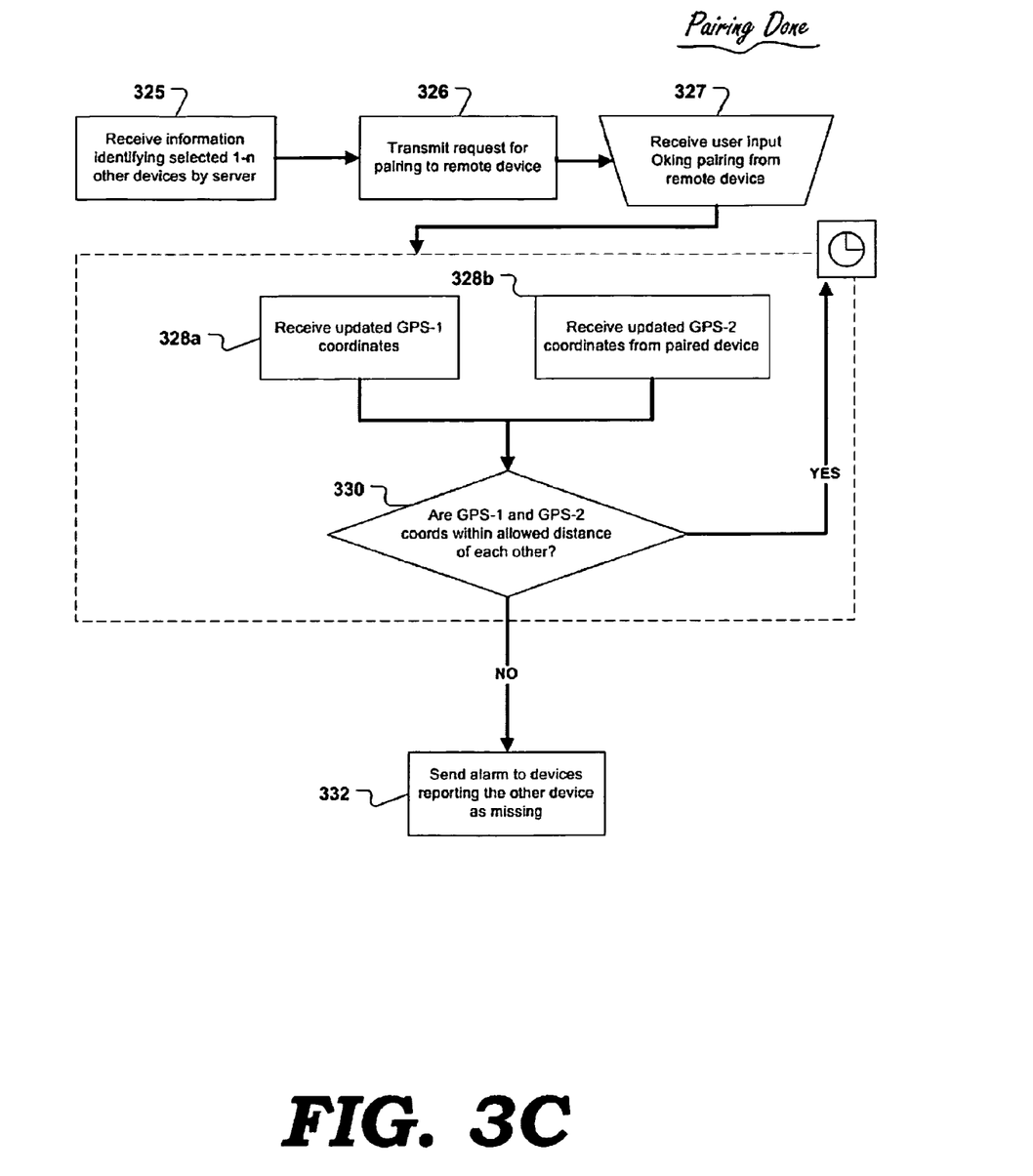

FIGS. 3A-3C are generalized flow diagrams illustrating a method for interconnecting electronic devices, allowing the devices to pair and alert each other when a device becomes lost. While many various ways of interconnecting electronic devices may exist (e.g. Bluetooth technology), the present preferred embodiment discloses a pairing via a server two or more electronic devices are in communication with.

Referring now to FIG. 3A, flow diagram 3A illustrates a user of an electronic device being displayed a list of potential "buddies", i.e. other electronic devices within physical proximity that the user's device could be paired with. At step 301, the user's device may authenticate to a server (service),e.g. by logging in with known credentials, social-network credentials, etc.

At step 302, the electronic device may obtain its GPS coordinates/location (e.g. from a GPS service, satellite, cell-communication network, etc.), and transmit its GPS location ("GPS-1") to the remote server at step 304.

At step 306, the server may authenticate the electronic device and receive its GPS-1 location. At steps 308-316, the server may traverse a list of other electronic devices, determining the electronic devices who geographic location is proximate to the present electronic device.

At step 308, the server may examine GPS coordinates of a first electronic device that had transmitted its GPS coordinates to the server, and at step 310 it may be determined whether the GPS coordinates of the first electronic device are within a physical proximity (could be a user setting, e.g. 100 ft) to GPS-1.

If it is determined at step 310 that the GPS coordinates of the first electronic device are within physical proximity of the present electronic device's GPS-1 coordinates, at step 312 information depicting the first electronic device (e.g. its device ID, user name and any other information identifying the first electronic device and/or its user and/or its GPS coordinates) may be transmitted to the present electronic device at step 312.

If it is determined at step 310 that the physical GPS coordinates of the first device are not sufficiently close to the GPS-1 coordinates of the present device, at step 314 the GPS coordinates of the next electronic device which had reported its GPS coordinates to the server, may be compared to the GPS-1 coordinates. Steps 310-314 may be repeated until it is determined, at step 316 that all GPS coordinates of all electronic devices have been compared with GPS-1, and at step 318, this flow may end.

Information transmitted at step 312 may be displayed to the user of the first electronic device at step 320. Referring now to FIG. 3B, information on devices and/or users-of-the-devices whose geographic coordinates are close to the GPS-1 coordinates of the present device, may be displayed at step 320. At step 322, input from the user of the present device may be received selecting one or more of the remote devices at step 320, with which to pair.

In alternate embodiments, further information and considerations may be factored into the logic of device pairing, such as devices that had been paired in the past, devices of users who are friends on a social network, etc.

At step 324 information inputted from the user at step 322, selecting the one or more other devices to be paired with, may be transmitted back to the server. Referring now to FIG. 3C, once logical pairing has been established, at step 325 where the server receives the input from the user of the present device, at step 326 a request for pairing may be sent to one or more users of the remote devices the user of the present device chose to pair with. At step 327, an OK may be received from one or more of the users of the remote devices (in this example, a single remote device OKs the pairing at step 327.)

At steps 328a and 328b, communications may be received by the server from all paired devices, in this example, the present device, transmitting its location as GPS-1, and the remote device, transmitting its location as GPS-2. The communications received by the server at steps 328a&238b may be initiated by the devices at pre-determined frequencies, or generated according to any other algorithm.

At step 330, a calculation may be made determining the geographic distance between the reported locations of the electronic devices, in this example, the distance between GPS-1 and GPS-2 may be computed and a determination may be made whether the two electronic devices are within allowed distance of each other. If it is determined the two electronic devices are not within an allowed distance (or other conditions prompting alarm, such as one of the devices not sending a communication over a certain allotted time span), at step 332 an alarm communication may be sent to both devices.

In various possible embodiments, the alarm communications may be sent out using "push notifications" and/or utilizing a polling mechanism wherein a client device polls the server for new messages. In other possible embodiments, more than two devices may be involved, and some of the devices may not be cellular or handheld. For example, an iPad® and an iPhone® carried by one or more people may be paired.

Figure 4A:
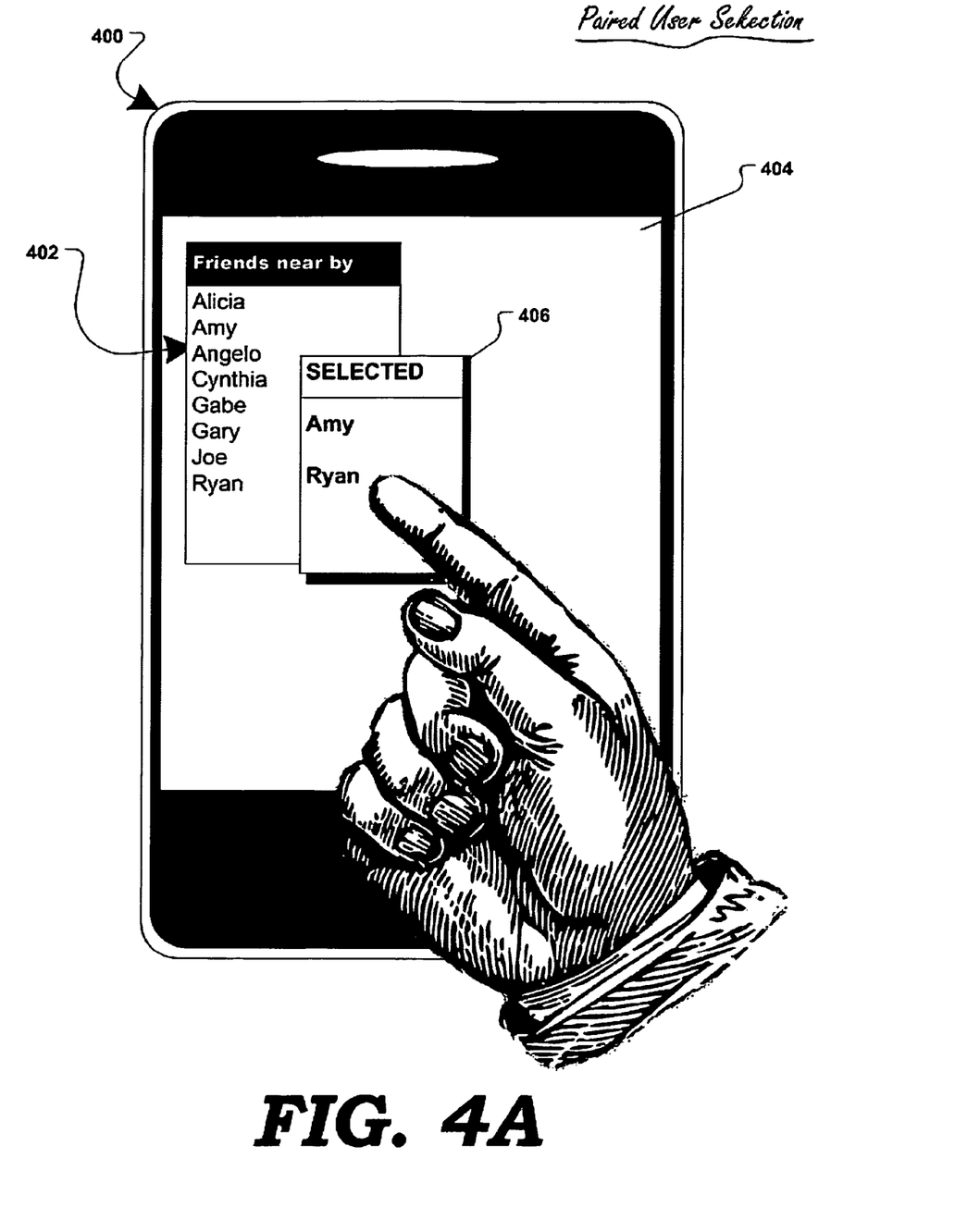
FIG. 4A-4B are generalized block diagrams illustrating presenting a user of an electronic device with a selection of "buddies", i.e. owners of other electronic devices available for pairing with; and allowing the user selection of one or more devices with which to pair; and, allowing the user to set various related settings.
Figure 4B:
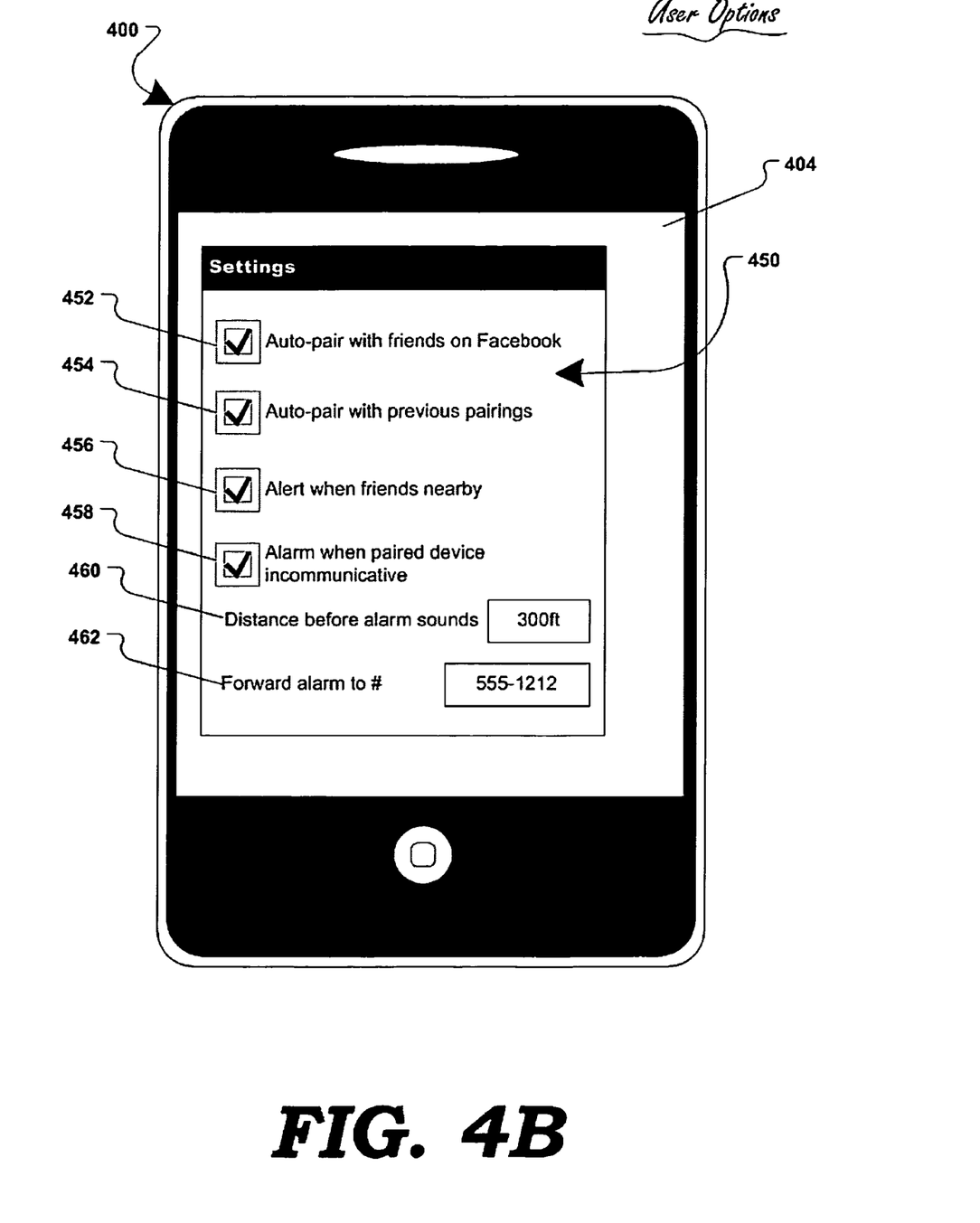

FIG. 4A-4B are generalized block diagrams illustrating presenting a user of an electronic device with a selection of "buddies", i.e. owners of other electronic devices available for pairing with; and allowing the user selection of one or more devices with which to pair; and, allowing the user to set various related settings.

Referring now to FIG. 4A, the user of an electronic device 400 may be displayed a list of friends nearby 402 within an application 404 running on the electronic device 400. The list of friends nearby 402 may be a dynamically-generated list of names, associated with electronic devices used by users whose names are listed, that are determined to be physically close to the electronic device 400, and/or contain names of friends of the user of the electronic device 400. Friends may be defined as social-network friends and/or people with whom the user of the electronic device 400 had previously paired, etc.

The user of the electronic device 400 may choose one or more friends 406 with whose devices the user's electronic device 400 is logically paired. In this example, electronic devices associated with "Amy" and "Ryan" are logically paired with the electronic device 4001; hence, a physical separation of any of the three electronic devices would create an alarm.

Referring now to FIG. 4B, a list of user settings 450 may be presented to a user of the electronic device 400. In one presently preferred implementation, the user settings may include: a setting allowing a user to automatically pair with their Facebook® friends 452, provided devices used by their Facebook (or any other social network) friends are in physical proximity and registered with a service provider providing the service of the present invention.

Another user setting may allow for automatic pairing to devices that had been paired before 454. For example, if the electronic device 400 had been previously paired with a device "Cynthia's iPhone 443ABC", next time the electronic device "Cynthia's iPhone 443ABC" registers with the service and reports its location to be in close proximity with the electronic device 400, automatic pairing of the two devices may be established via the setting 454.

Another possible setting is alerting when friends (i.e. social network friends, etc.) are nearby via option 456. Devices registering their GPS coordinates and reporting their unique identifiers and/or their user identifiers that are determined to be in close physical proximity, may generate an alert requesting a pairing.

Another possible setting is sounding an alarm when a paired device becomes incommunicative 458. Once two or more devices are logically paired, according to this setting, if one or more of the paired devices stops transmitting its location for a given period (e.g. its battery died, it has been turned off, etc.) an alarm is transmitted to all the paired devices.

Another possible setting is a threshold distance between paired devices before an alarm is sounded 460. Users may want to adjust the threshold distance depending on situations. For example, users sitting together in a taxi cab may set the threshold distance to be very close, e.g. 3 feet, since the two users may not be separated by more than that distance without leaving the cab, which is when the alarm should sound. On the other hand, the same users being at a trade show may allow themselves a much greated distance, e.g. 1000 ft separation, before an alarm sounds.

Another possible setting is an ability to forward an alarm to a different device 462 via a phone number, or any other messaging system. For example, the use of the electronic device 400 may input the phone number of a land-line phone to automatically be called when an alarm is generated.

What is claimed is:

1. A method for alerting users of electronic devices when the electronic devices become physically separated from one another by more than an allowed distance, the method including:

providing a first and a second electronic devices, wherein each of the electronic devices includes an application that is coupled to a digital service on the interne and a display for displaying alerts;

receiving a first set of unique identification and global position system ("GPS") coordinates from the first electronic device, wherein the first set from the first electronic device is received by the digital service;

receiving a first set of unique identification and GPS coordinates from the second electronic device, wherein the first set from the second electronic device is received by the digital service;

determining the first electronic device and the second electronic device are logically paired;

setting a threshold maximum allowed physical separation distance between the first and the second electronic devices;

computing a first physical distance between the first GPS coordinates and the second GPS coordinates and determining the first physical distance is less than the threshold maximum allowed physical distance;

receiving a second set of unique identification and GPS coordinates from the first electronic device and a second set of unique identification and GPS coordinates from the second electronic device;

computing a second physical distance between the first GPS coordinates and the second GPS coordinates and determining the second physical distance is greater than the threshold maximum allowed physical distance;

in response to determining the second physical distance is greater than the threshold maximum allowed physical distance, transmitting an alert message to the first and to the second electronic devices; and displaying the alert message on the display of the first and the display of the second electronic devices.

2. The method of claim 1, wherein at least one of the electronic devices is a mobile phone.

3. The method of claim 1, wherein at least one of the first or the second GPS coordinates are obtained from a cellular communications network.

4. The method of claim 1, wherein at least one of the first or the second GPS coordinates are obtained from a GPS satellite.

5. The method of claim 1, wherein the threshold maximum allowed physical separation distance is set by at least one of: a user of the first electronic device or a user of the second electronic device.

6. The method of claim 1, wherein at least one of: the first unique identification or the second unique identification includes a name of a user of the first and/or the second electronic device.

7. The method of claim 6, wherein the user of the first electronic device and the user of the second electronic device are aware of one another by name prior to step of determining the first electronic device and the second electronic device are logically paired.

8. The method of claim 7, wherein at least one of the user of the first electronic device and/or the user of the second electronic device are required to confirm the logical pairing of the first and the second electronic devices.

9. The method of claim 7, wherein the logical pairing occurs automatically if it is determined that the user of the first and the user of the second electronic devices are friends on a social network.

10. The method of claim 7, wherein the logical pairing occurs automatically if it is determined that the user of the first and the user of the second electronic devices had pre-approved automatic logical pairing.

11. The method of claim 1, wherein at least one of the first set or the second set of the unique identification and GPS coordinates are transmitted to the digital service at pre-determined intervals.

12. The method of claim 1, wherein at least one of the first set or the second set of the unique identification and GPS coordinates are transmitted to the digital service in response to a request by the digital service.

13. The method of claim 1, wherein a data store is implemented by the digital service for storing at least one of the first set or the second set of the unique identification and GPS coordinates.

14. The method of claim 13, wherein the data store is implemented by the digital service for storing subsequent sets of unique identification and GPS coordinates.

15. The method of claim 14, wherein in response to a request by at least one of the first or the second electronic devices, the stored subsequent sets are transmitted to the at least one of the first or the second electronic devices.

16. The method of claim 1, wherein the first and/or the second electronic device receiving the alert message plays an audible media.

17. The method of claim 1, wherein more than two electronic devices are logically paired.

18. The method of claim 1, wherein electronic messages between the digital service and the first and/or the second electronic devices are transmitted via push technology.

* * * * *